United States Patent [19]

Tadokoro

[11] Patent Number: 4,942,407
[45] Date of Patent: Jul. 17, 1990

[54] SCANNING TYPE IMAGE RECORDING APPARATUS

[75] Inventor: Hiroyuki Tadokoro, Hitachi, Japan

[73] Assignee: Hitachi, Ltd., Tokyo, Japan

[21] Appl. No.: 416,497

[22] Filed: Oct. 3, 1989

[30] Foreign Application Priority Data

Oct. 5, 1988 [JP] Japan .................. 63-249867

[51] Int. Cl.⁵ ............................................. G01D 15/14
[52] U.S. Cl. ...................................... 346/108; 346/160
[58] Field of Search ......................... 346/108, 160, 155

[56] References Cited

U.S. PATENT DOCUMENTS

| | | | |
|---|---|---|---|
| 4,251,821 | 2/1981 | Kimura | 346/108 |
| 4,257,053 | 3/1981 | Gilbreath | 346/108 |
| 4,404,570 | 9/1983 | Ohnishi et al. | 346/108 |
| 4,449,153 | 5/1984 | Tschang | 346/108 X |

FOREIGN PATENT DOCUMENTS 8112 1/1981 Japan.
101961 6/1984 Japan.

Primary Examiner—Donald A. Griffin
Attorney, Agent, or Firm—Antonelli, Terry, Stout & Kraus

[57] ABSTRACT

A pixel signal which is sent together with an emphasis request signal and the like from a pixel information generating section to a scanning type image recording unit is reduced or enlarged by a fine adjusting section provided in the scanning type image recording unit and is used to modulate a laser beam. The scanning type image recording unit has an operation panel to generate a pixel reduction or enlargement request signal. The fine adjusting section enlarges or reduces the pixel signal in accordance with a request signal which is given from the operation panel.

13 Claims, 9 Drawing Sheets

SCANNING TYPE IMAGE RECORDING APPARATUS

BACKGROUND OF THE INVENTION

1. Field of the Invention

The present invention relates to an image recording apparatus and, more particularly, to a scanning type image recording apparatus for scanning a light beam and recording an image corresponding to a time sequential pixel signal onto a recording medium.

2. Description of the Prior Art

Hitherto, such a kind of scanning type image recording apparatus has been disclosed in JP-A-56-8112. The scanning type image recording apparatus is of the type in which a non-exposal portion which is not exposed by a light beam is developed. As compared with the type in which an exposed portion is developed, an "image fading" phenomenon occurs. Therefore, the "image fading" phenomenon is corrected by changing the pulse width of the time sequential pixel signal. However, nothing is considered with respect to a pulse width fluctuation due to a signal waveform distortion when the time sequential pixel signal passes through a signal transmission path.

According to the invention disclosed in JP-A-59-101961, there has been proposed a technique in which for a pulse width fluctuation due to a signal waveform distortion when a time sequential pixel signal passes through a signal transmission path, the time sequential pixel signal is latched by a clock signal which passes through the signal transmission path having the same characteristic, and the pulse width of the time sequential pixel signal transmitted is reconstructed.

However, in the conventional technique as disclosed in JP-A-56-8112 or 59-101961, nothing is considered with respect to a point of fluctuations of the developing level, light amount, and the like which are time dependent fluctuation elements on what is called a zerography technique as a basic technique of the scanning type image recording apparatus. There is a problem such that the image quality fluctuates as the time elapses.

In addition, no consideration is made with respect to the type in which the exposed portion is developed and there is a problem such that an "image thickening" phenomenon occurs.

There is also a problem such that a change value to the pulse width is a fixed value and each user cannot select the image quality which is actually needed.

On the other hand, for the function to thicken only the image of an arbitrary continuous scanning line portion in one page, what is called a bold function (to widen the line width) as a kind of image emphasis or the like, a countermeasure to cope with such a function by changing the pulse width is not taken. There is also a problem such that a memory capacity of a ROM for a character pattern on the side of the pixel signal generating means increases or the character pattern generating logic becomes complicated.

SUMMARY OF THE INVENTION

It is an object of the invention to provide an image recording apparatus for recording an image of a quality which is actually needed by a user.

Another object of the invention is to provide an image recording apparatus for recording an image of a quality which is stable even for fluctuations of a developing level, a light amount, and the like as time dependent fluctuation elements.

Still another object of the invention is to provide an image recording apparatus having a suitable bold function and the like.

According to a first aspect of the invention, in order to accomplish the above objects, there is provided a scanning type image recording apparatus in which an electrostatic latent image is formed onto a recording medium by clock signal generating means for generating a clock signal, pixel signal generating means for generating a time sequential pixel signal synchronously with the clock signal, modulating means for modulating a light beam in accordance with the time sequential pixel signal, scanning means for deflecting the light beam and scanning the recording medium, and start point detecting means which is provided over a scanning line of the light beam deflected by the scanning means and feeds back scan start timing information to the clock signal generating means and to the pixel signal generating means, and the electrostatic latent image is developed by developing means. The image recording apparatus further comprises: input means for indicating a fine adjustment value of a pulse width of the time sequential pixel signal; scanning position control means for discriminating that the scanning line of the light beam does not exist on the recording medium on the basis of the scan start timing information from the start point detecting means; and pulse width fine adjusting means for setting a pulse width fine adjustment value in accordance with an indication of the input means during the discriminating operation of the scan position control means and for outputting a final pixel signal which is derived by finely adjusting the time sequential pixel signal to the modulating means.

According to a second aspect of the invention, there is provided a scanning type image recording apparatus comprising: pixel signal input means for inputting a pixel signal to be recorded from upper pixel signal generating means; modulating means for modulating a light beam in accordance with the pixel signal;

scanning means for deflecting the modulated light beam, for scanning and exposing a recording medium, and for forming an electrostatic latent image onto the recording medium; and developing means for developing the electrostatic latent image formed on the recording medium.

The image recording apparatus further comprises: user input means which is provided on an operation panel and indicates a picture quality fine adjustment value of a recording image based on the pixel signal; and pulse width fine adjusting means for setting a pulse width fine adjustment value in accordance with an indication from the user input means and for giving to the modulating means a final pixel signal obtained by finely adjusting a pulse width of the pixel signal in accordance with the set picture quality fine adjustment value.

According to a third aspect of the invention, there is provided an image recording system which is constructed by an upper pixel information generating apparatus having clock signal generating means for generating a clock signal and pixel signal generating means for generating a time sequential pixel signal synchronously with the clock signal, and a scanning type image recording apparatus which is connected to the pixel information generating apparatus through a transmission path.

The scanning type image recording apparatus comprising: latching means for latching the time sequential pixel signal transmitted through the signal transmission path by the clock signal transmitted through the signal transmission path and for outputting a shaped pixel signal; modulating means for modulating a light beam in accordance with the shaped pixel signal; scanning means for deflecting the modulated light beam, for scanning and exposing a recording medium, and for forming an electrostatic latent image onto the recording medium; start point detecting means, provided over a scanning line extension of the light beam which is deflected by the scanning means, for detecting the passage of the light beam and for feeding back scan start timing information to the pixel signal generating means; and developing means for developing the electrostatic latent image formed on the recording medium by the scanning and exposure.

The modulating means in the scanning type image recording apparatus comprises: input means which is provided on an operation panel of the image recording apparatus and indicates a fine adjustment value of the pulse width of the shaped pixel signal; scanning position control means for discriminating that the scanning position of the light beam does not exist in a recording area on the recording medium on the basis of the scan start timing information from the start point detecting means; and pulse width fine adjusting means for setting the pulse width fine adjustment value in accordance with an indication from the input means for a period of time when the light beam does not scan the recording area on the recording medium and, thereafter, for finely adjusting the pulse width of the shaped pixel signal which is input during the scanning of the recording area on the recording medium in accordance with the fine adjustment value and for outputting a final pixel signal to modulate the light beam.

A request for correcting an image which is faded or thickened too much is sent to the pulse width fine adjusting means as set information for the image which is actually needed by the user.

The time dependent fluctuations of the charges and the like of the non-exposed portion in the electrostatic latent image are automatically returned to the pulse width fine adjusting means in the apparatus as detection information of the fluctuations of the developing level, light amount, and the like. A request to emphasize an image is sent from the pixel signal generating means to the pulse width fine adjusting means as designation information of the bold function or the like.

In accordance with the input information such as setting information for an image or designation information of the bold function, and the like which are actually needed by the user, the pulse width fine adjusting means selects the optimum pulse width in conformity with the requests and outputs the final pixel signal to the modulating means. Thus, the image quality which is actually needed by the user can be obtained.

On the other hand, in accordance with the input information of the detection information of the fluctuations of the developing level, light amount, and the like, the pulse width fine adjusting means finely optimally adjusts the pulse width so as to always stabilize the thickness of the image and outputs the final pixel signal to the modulating means, so that the stable image quality can be obtained.

DESCRIPTION OF THE PREFERRED EMBODIMENT

An embodiment of the present invention will be described in detail hereinbelow with reference to the drawings.

Figure 1:
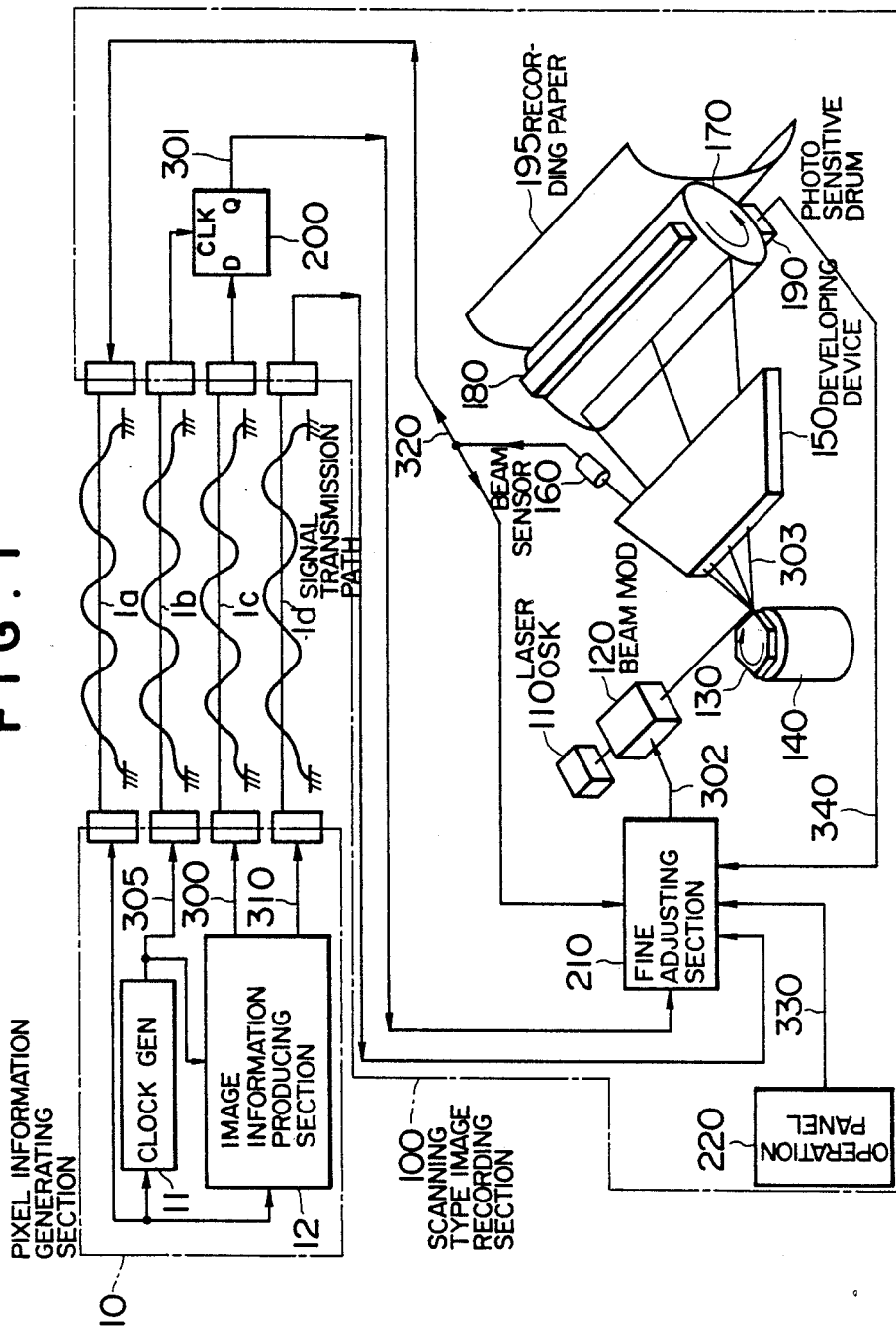
FIG. 1 is a whole constructional diagram showing an embodiment of the present invention.

FIG. 1 shows a scanning type image recording section 100 and a pixel information generating section 10.

The pixel information generating section 10 is connected to the scanning type image recording section 100 via signal transmission paths 1a, 1b, 1c, and 1d. The pixel information generating section 10 comprises: a clock generating section 11; and a pixel information producing section 12 for generating a pixel signal 300 and an emphasis request signal 310 in accordance with a clock signal 305 from the clock generating section 11 and a scan start timing signal 320, which will be explained hereinlater.

Figure 2:
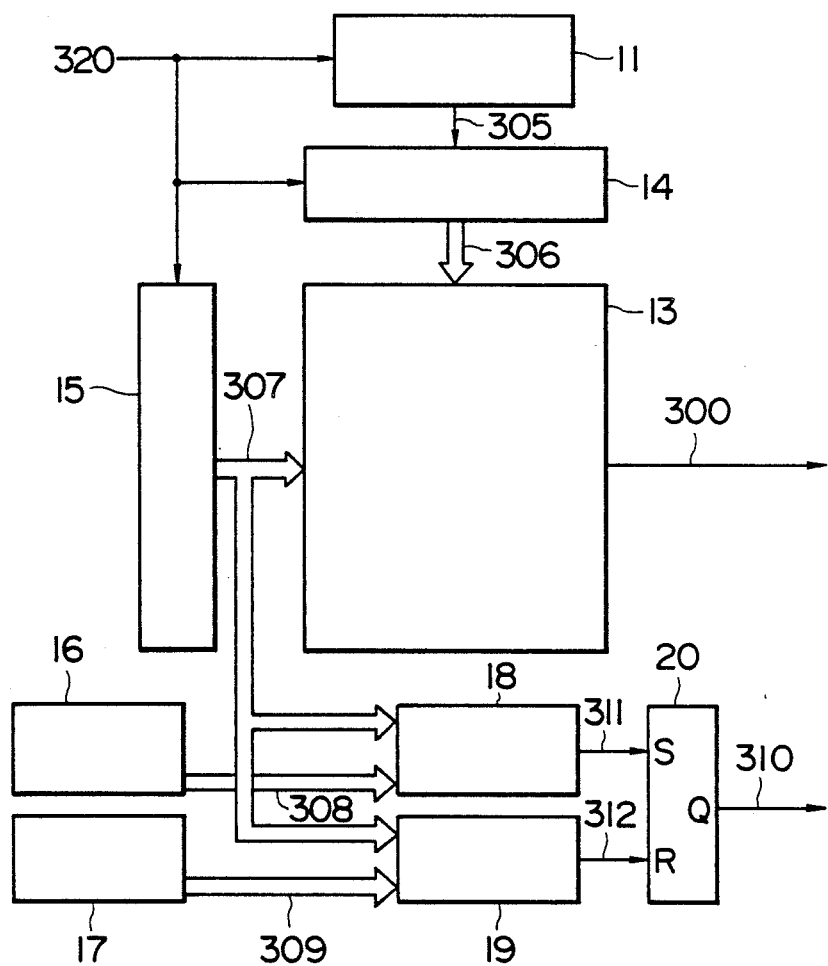
FIG. 2 is a block diagram of a pixel information generating section.
Figure 3:
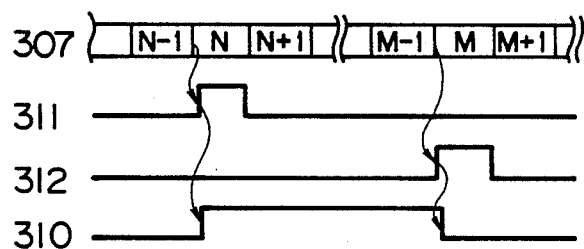
FIG. 3 is a timing chart of FIG. 2.

The pixel information generating section 10 will now be described in detail with reference to FIGS. 2 and 3.

Reference numeral 13 denotes a page memory in which image data in one page in sentences which are edited by, for instance, a word processor or the like is stored. Column addresses 306 for the page memory 13 are produced by a column address counter 14 which counts up in response to the clock signal 305 and is cleared by the scan start timing signal 320. The clock signal 305 is also cleared by the scan start timing signal 320 and its phase is synchronized. On the other hand, row addresses 307 for the page memory 13 are produced by a row address counter 15 which counts up in response to the scan start timing signal 320. The image data in the page memory 13 which are stored in an area determined by the column address 306 and the row address 307 are transmitted as the pixel signal 300 to the scanning type image recording section 100 through the signal transmission path 1c.

Further, the row address 307 is also input to digital comparators 18 and 19. An emphasis unnecessary final row address 308 from an emphasis final row memory section 16 is input to the other input terminal of the digital comparator 18. When both of them coincide, an emphasis request setting signal 311 is output. On the other hand, an emphasis necessary final row address 309 from an emphasis necessary final row memory section 17 is input to the other input terminal of the digital comparator 19 when they coincide, an emphasis request resetting signal 312 is output. The data input operations to the memory sections 16 and 17 are executed at the time point when a word processor or the like edits a document.

For instance, when an image existing in an interval between (N+1) and (M) of the row addresses 307 is emphasized, (N) is input to the emphasis unnecessary final row memory section 16 and (M) is input to the emphasis necessary final row memory section 17. When the row address 307 is set to (N), the emphasis request setting signal 311 is input from the digital comparator 18 to an S terminal of an SR type flip-flop 20 and the emphasis request signal 310 from a Q terminal is set to the high level. Next, when the row address 307 is set to (M), the emphasis request resetting signal 312 is input from the digital comparator 19 to an R terminal of the SR type flip-flop 20 and the emphasis request signal 310 from the Q terminal is set to the low level. The emphasis request signal 310 is transmitted to the image recording section 100 via the signal transmission path 1d.

The pixel signal 300 obtained on the scanning type image memory section 100 side as mentioned above is input to a D terminal of a D type flip-flop 200. The clock signal 305 is input to a CLK terminal of the flip-flop 200 through the signal transmission path 1b. The waveform distortion of the pixel signal 300 which is subjected by the signal transmission path 1c is waveform shaped and a resultant shaped pixel signal 301 is output from a Q terminal of the flip-flop 200. Hitherto, the shaped pixel signal 301 is directly applied to a beam modulator 120 and a beam is modulated.

The invention has a feature such that the shaped pixel signal 301 is changed by a fine adjusting section 210. The fine adjusting section 210 will be explained hereinlater.

The scanning type image recording section 100 will now be described in detail.

A laser beam generated from a laser oscillator 110 is led to the beam modulator 120. An acoustic optical modulating device using the well-known acoustic optical effect or an electric optical device using the electric optical effect is used as the beam modulator 120. The power of the laser beam which is input to the beam modulator 120 is modulated in accordance with the input pixel signal to the beam modulator 120 and the modulated laser beam is output.

In the case where a semiconductor laser oscillator or the like is used as the laser oscillator 110, the pixel signal is input to the laser oscillator 110 and the laser beam which is generated is modulated.

The laser beam which is output from the beam modulator 120 is input to a polygon rotating mirror 130 having a plurality of mirror surfaces. The mirror 130 is driven by a motor 140 which is rotated at a constant speed at a high accuracy. The laser beam is horizontally swept. A laser beam 303 is focused as a spot onto a photosensitive drum 170 by a well-known focusing lens 150 having the f·θ characteristics. A beam sensor 160 detects the position where the laser beam 303 starts its scan along a line or row. The generation start timing of the signal to the beam modulator 120 to give desired light information to the photo sensitive drum 170 is determined by the scan start timing signal 320 as a detection signal of the beam sensor 160. The signal 320 is input to the pixel information generating section 10 via the signal transmission path 1a.

The photo sensitive drum 170 is a recording medium based on the zerography technique. The surface of the drum 170 is uniformly charged by a charging device 180 and an electrostatic latent image is then formed on the drum surface by a laser beam exposure. Further, the electrostatic latent image is developed by a developing device 190.

Figure 4:
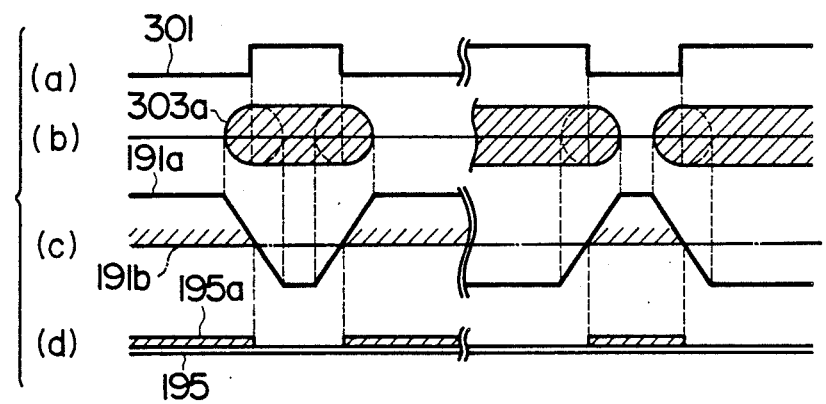
FIGS. 4 and 5 are diagrams for explaining developing processes.
Figure 5:
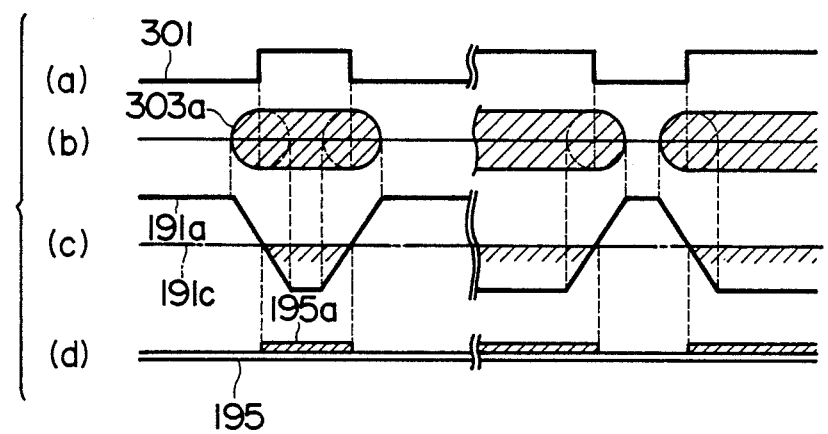

FIGS. 4 and 5 show processes for development. FIG. 4 shows the case of the (normal developing) type in which the non-exposed portion is developed. FIG. 5 shows the case of the (inversional developing) type in which the exposed portion is developed. In both diagrams, (A) denotes a shaped pixel signal; (B) indicates an exposed section 303a by the laser beam 303; (C) represents a potential change 191a on the photo sensitive drum 170 due to the exposure and normal and inversional developing levels 191b and 191c; and (D) indicates a toner image 195a which is copy transferred onto a recording paper 195.

In the case of the normal developing type, the area in which the potential of the electrostatic latent image on the drum 170 is set to the normal developing level 191b or more is developed. In the case of the inversional developing type, the area in which the potential of the electrostatic latent image on the drum 170 is set to the inversional developing level 191c or less is developed.

The developed toner image 195a is copy transferred to the recording paper 195 by a copy transferring device (not shown).

The fine adjusting section 210 will now be described with reference to FIGS. 6 to 13.

Figure 6:
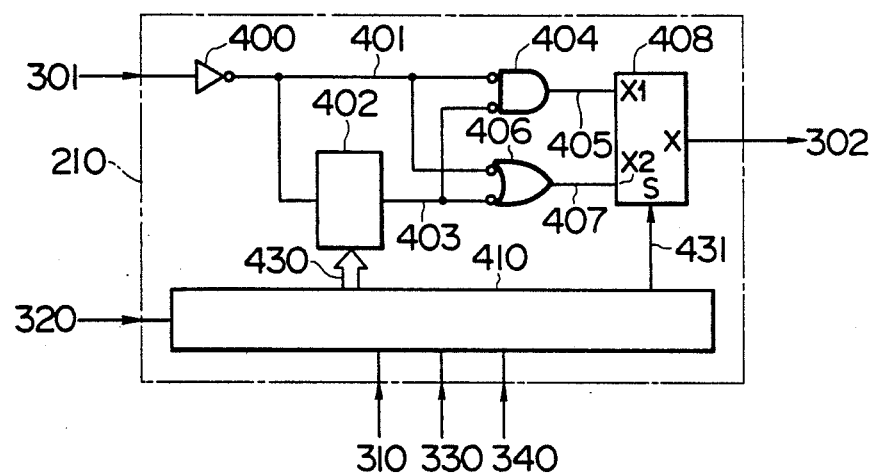
FIG. 6 is a block diagram of a fine adjusting section.
Figure 7:
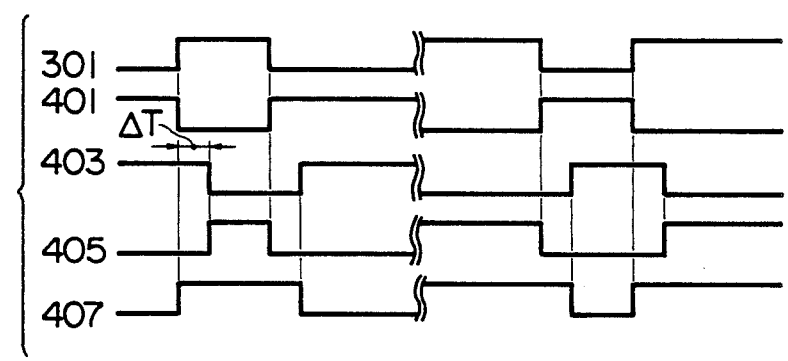
FIG. 7 is a timing chart of FIG. 6.
Figure 8:
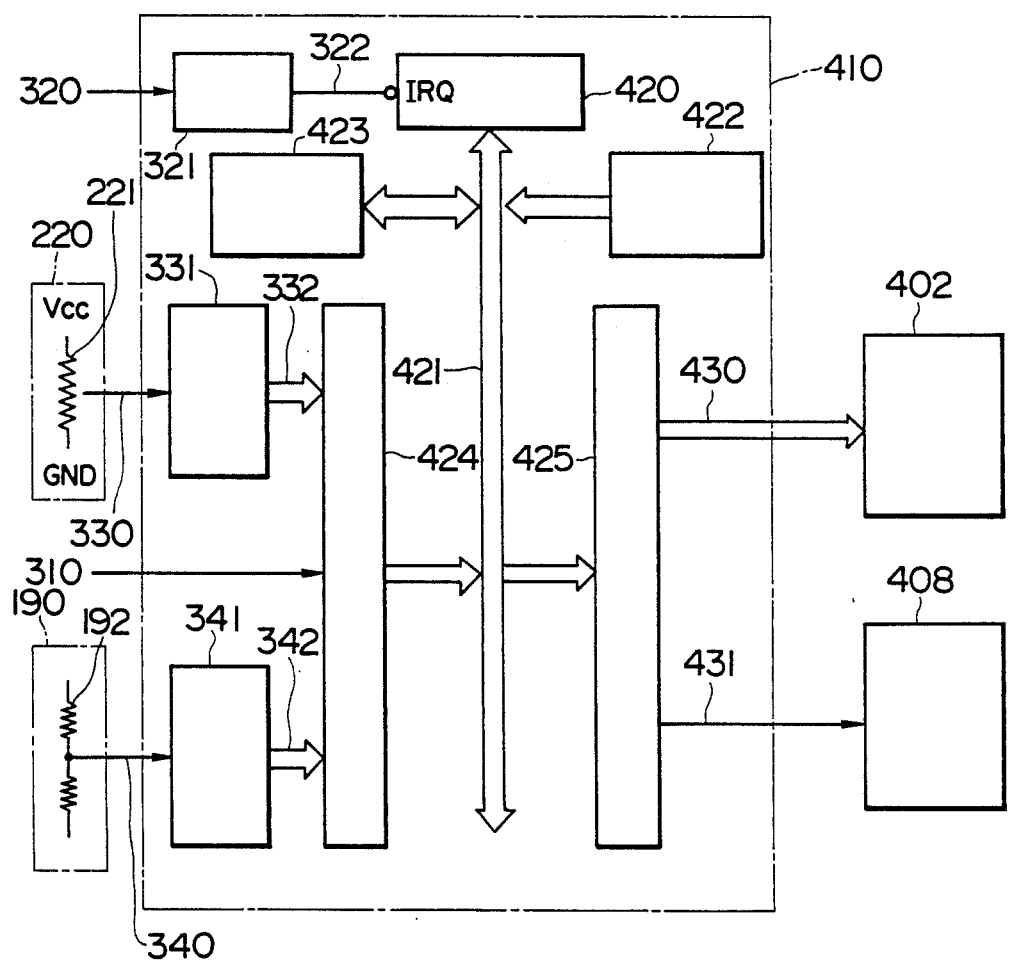
FIG. 8 is a block diagram of a fine adjustment value determining section.

In the fine adjusting section 210, as shown in FIGS. 6 and 7, an inverted pixel signal 401 is formed by an inverter circuit 400 on the basis of the shaped pixel signal 301. An inverted delay signal 403 is formed from the inverted pixel signal 401 by a delay circuit 402, which will be explained hereinlater. A delay time value ($\Delta T$) is determined by a delay time indication signal 430 from the fine adjustment value determining section 410, which will be explained hereinlater. The inverted pixel signal 401 and inverted delay signal 403 are input to a 2-input NOR circuit 404 and a 2-input NAND circuit 406. A reduction pixel signal 405 is obtained from the 2-input NOR circuit 404. An enlargement pixel signal 407 is derived from the 2-input NAND circuit 406. The reduction pixel signal 405 and enlargement pixel signal 407 are input to $X_1$ and $X_2$ terminals of a selecting circuit 408. The selecting circuit 408 is controlled by a selection signal 431 from a fine adjustment value determining section 410, which will be explained hereinlater, and selects either the reduction pixel signal 405 or the enlargement pixel signal 407 as a final pixel signal 302.

Figure 9:
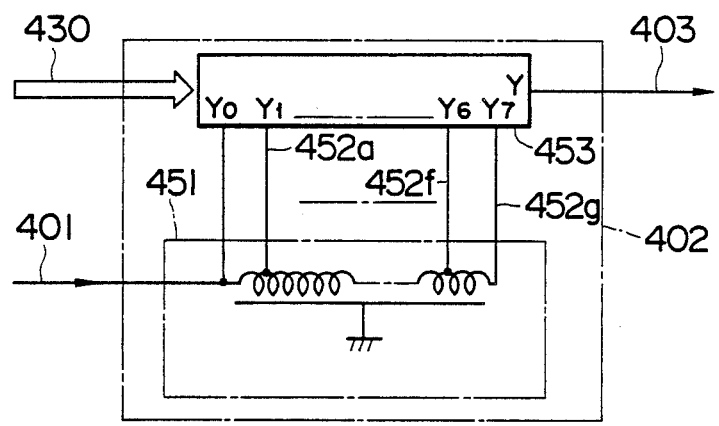
FIG. 9 is a circuit diagram of a delay circuit.
Figure 10:
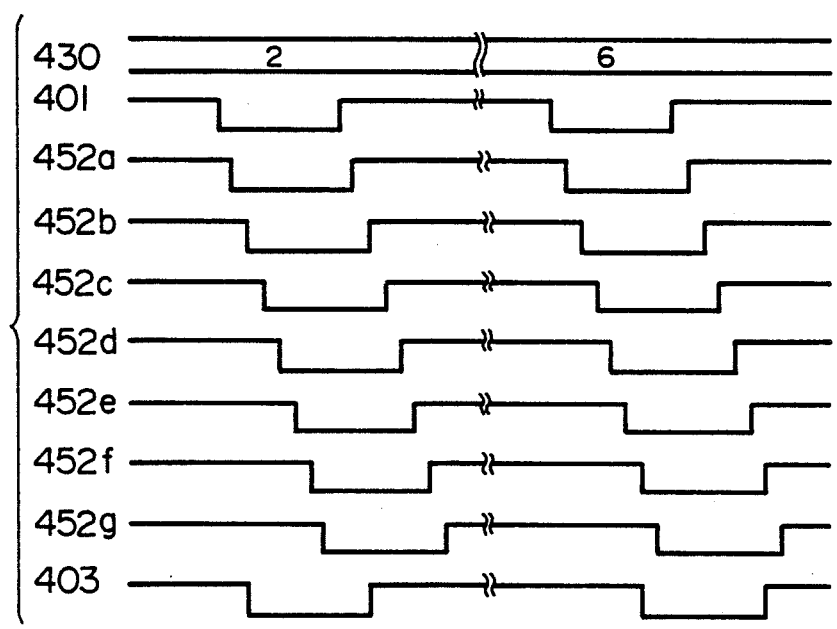
FIG. 10 is a timing chart of FIG. 9.
Figure 11:
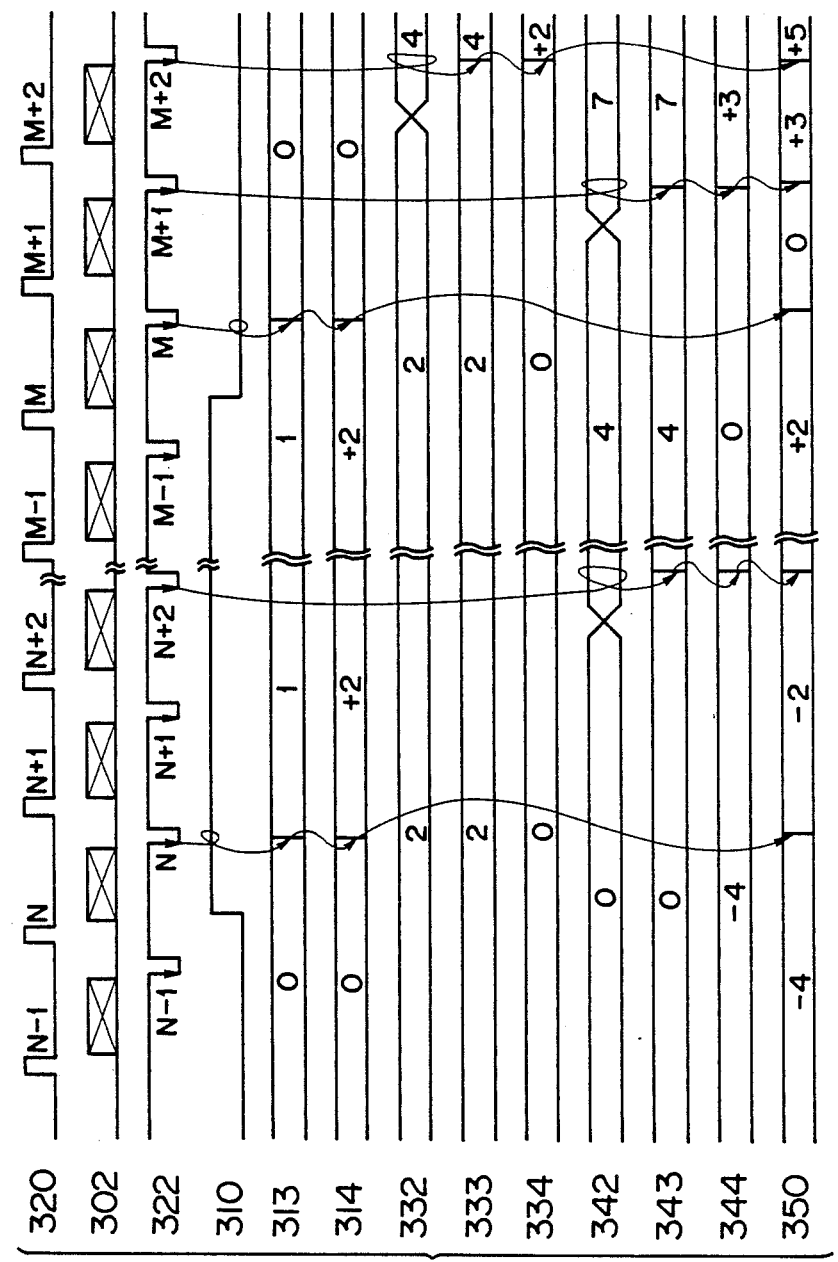
FIG. 11 is a timing chart of FIG. 8.

The delay circuit 402 will now be described in detail with reference to FIGS. 9 and 10. The inverted pixel signal 401 is input to a delay element 451 such as a delay line or the like. In the embodiment, delay signals 452 having different delay times are output from the delay element 451. In the embodiment, the case where there are seven kinds of delay signals 452 will be described hereinbelow. The inverted pixel signal 401 having no delay time and seven kinds of delay signal groups 452a to 452g are input from a $Y_0$ terminal to a $Y_7$ terminal of an 8-input selecting circuit 453. The 8-input selecting circuit 453 is controlled by the delay time indication signal 430 (in the embodiment, digital values of "0" to "7") from the fine adjustment value determining section 410, which will be explained hereinlater. When the delay time indication signal 430 is set to "0", the selecting circuit 453 outputs the inverted pixel signal 401 as the inverted delay signal 403. When the delay time indication signal 430 is set to "1", the selecting circuit 453 outputs the delay signal groups 452a as the inverted delay signal 403. When the delay time indication signal 430 is set to "7", the selecting circuit 453 outputs the delay signal group 452g as the inverted delay signal 403.

The fine adjustment value determining section 410 will now be described in detail with reference to FIGS.

8 and 11. The determining section 410 uses a CPU 420 as a logical center and comprises: a system bus 421; a ROM 422 in which a system software, a data table for fixed values which are used to decide a fine adjustment value, and the like are stored; a RAM 423 which is used for applications of a work area upon calculations, a memory area of data, flags, and the like, etc.; an input port 424 to latch data from an input means group to indicate a fine adjustment value; and an output port 425 to output the delay time indication signal 430 to the delay circuit 402 and the selection signal 431 to the selecting circuit 408.

An interruption signal 322 which is formed by an interruption generating circuit 321 on the basis of the scan start timing signal 320 is input to an interruption (IRQ) terminal of the CPU 420. The interruption generating circuit 321 forms the interruption signal 322 after the elapse of the time when the laser beam passes on the photo sensitive drum after the scan start timing signal 320 is input, i.e. the time interval between end of a scan along one line and start of the next scan or at a timing (for instance, for a time interval between scans on adjacent two pages of a document or the like) other than the timing for development although the laser beam is passing on the photo sensitive drum.

As input signals to indicate a fine adjustment value, there are provided: the emphasis request signal 310 (in the embodiment, a digital value of "0" corresponding to the absence of the request or "1" corresponding to the presence of the request) from the image information generating section 10; an operator request signal 332 (in the embodiment, a digital value of "0" to "4"; it is set to "4" in the case of the request for thickening, while it is set to "0" in the case of the request for fading) which is obtained by digitizing by an AD converter 331 an operator request analog signal 330 which is requested by an operator's knob (for instance, an axis of a variable resistor 221 or the like) provided on an operation panel 220 of the scanning type image recording section 100; and a self request signal 342 (in the embodiment, a digital value of "0" to "7"; it is set to "7" when the developing level 191 is high, while it is set to "0" when the developing level 191 is low) which is obtained by digitizing by an AD converter 341 a self request analog signal 340 from a developing level sensor 192 (for instance, a sensor to feed back the developing bias potential which is ordinarily applied to the developing device 190 from its current) provided in the developing device 190.

Figure 12:
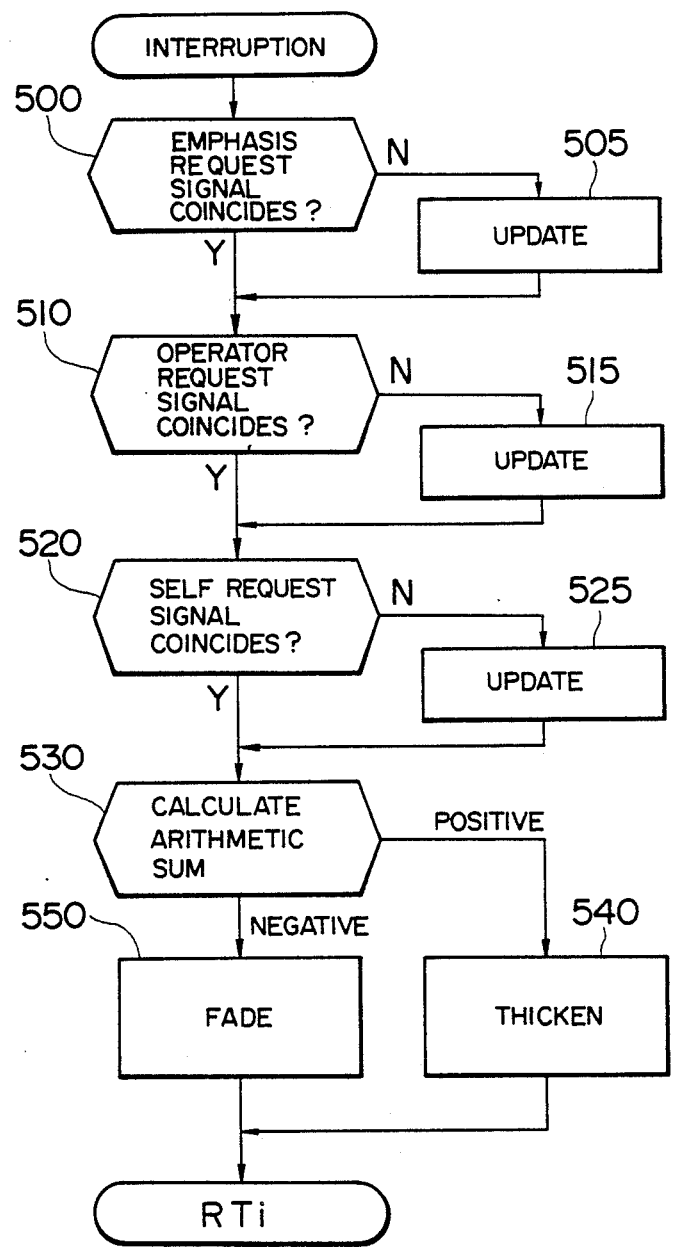
FIG. 12 is a flowchart of FIG. 8.
Figure 13:
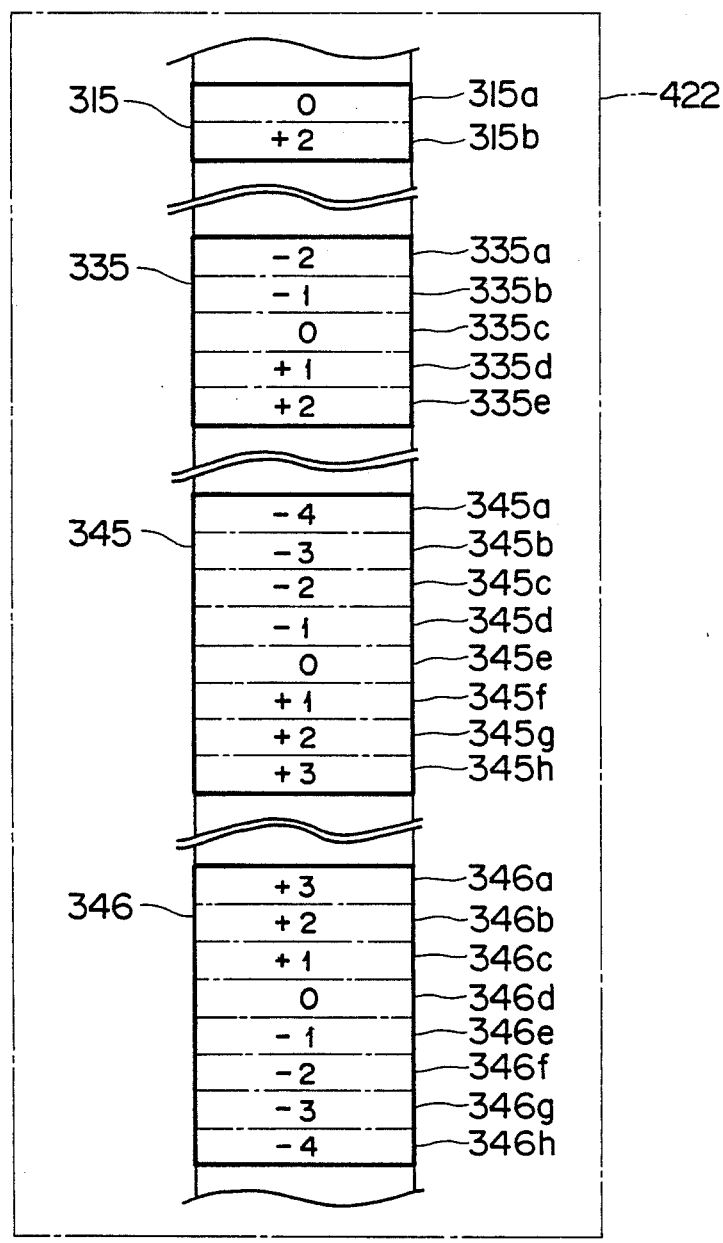
FIG. 13 is a table assignment diagram in a ROM.

When the interruption signal 322 is generated, the CPU 420 executes the following processes in accordance with FIG. 12 on the basis of the emphasis request signal 310, operator request signal 332, self request signal 342, and the like.

First, the emphasis request signal 310, operator request signal 332, and self request signal 342, which are the data from the input means groups, are updated and stored into the RAM 423 as emphasis request data 313, operator request data 333, and self request data 343 every occurrence of the interruption, respectively.

On the other hand, emphasis fine adjustment value data 314, operator fine adjustment value data 334, and self fine adjustment value data 344, which are the fine adjustment value data corresponding to the emphasis request data 313, operator request data 333, and self request data 343, are updated and stored into the RAM 423 with reference to an emphasis fine adjustment value data table 315, an operator fine adjustment value data table 335, and a normal development self fine adjustment value data table 345 or an inversional development self fine adjustment value data table 346 in the ROM 422. Each of the fine adjustment value data is constructed by complements of 2 and a positive value has a meaning to thicken the image and a negative value has a meaning to fade the image.

When each interruption occurs, the CPU 420 checks to see if the present emphasis request signal 310 is the same as the emphasis request data 313 which is already stored or not in step 500. If they coincide, step 510 follows. If they differ, in step 505, the data of the present emphasis request signal 310 is updated and stored as the new emphasis request data 313 and, further, the value in the emphasis fine adjustment value data table 315 corresponding to the new emphasis request data 313 is updated and stored into the emphasis fine adjustment value data 314. For instance, in the case of the Nth interruption occurrence of the interruption signal 322, the value of the emphasis request data 313 which is already stored is set to "0" and differs from the value "1" of the emphasis request signal 310. Therefore, the emphasis request data 313 is updated to "1". Further, the value "+2" in an emphasis fine adjustment value data table 315b corresponding to the value "1" of the emphasis request data 313 is updated and stored into the emphasis fine adjustment value data 314.

In the next step 510, a check is made to see if the present operator request signal 332 coincides with the operator request data 333 which is already stored or not. If they coincide, step 520 follows. If they differ, in step 515, the data of the present operator request signal 332 is updated and stored as the new operator request data 333 and, further, the value in the operator fine adjustment value data table 335 corresponding to the new operator request data 333 is updated and stored into the operator fine adjustment value data 334. For instance, in the case of the (M+2)th interruption occurrence of the interruption signal 322, the value of the operator request data 333 which is already stored is "2" and differs from the value "4" of the operator request signal 332. Therefore, the operator request data 333 is updated to "4". Further, the value "+2" in an operator fine adjustment value data table 335e corresponding to the value "4" of the operator request data 333 is updated and stored into the operator fine adjustment value data 334.

In step 520, a check is then made to see if the present self request signal 342 coincides with the self request data 343 which is already stored or not. If they coincide, step 530 follows. If they differ, in step 525, the data of the present self request signal 342 is updated and stored as the new self request data 343 and, further, the value in the normal development self fine adjustment value data table 345 corresponding to the new self request data 343 in the case of the normal developing type or the value in the inversional development self fine adjustment value data table 346 corresponding to the new self request data 343 in the case of the reversional developing type is updated and stored in the self fine adjustment value data 344. For instance, in the case of the normal developing type and the (M+1)th interruption occurrence of the interruption signal 322, the value of the self request data 343 which is already stored is "4" and differs from the value "7" of the self request signal 342. Therefore, the self request data 343 is updated to "7" and, further, the value "+3" in a normal development self fine adjustment value data table 345h corresponding to the value "7" of the self request data 343 is updated and stored into the self fine adjustment value data 344.

In the next step 530, the arithmetic sum of the emphasis fine adjustment value data 314, operator fine adjustment value data 334, and self fine adjustment value data 344 is calculated and the result is set to a synthetic fine adjustment value data 350. When the synthetic fine adjustment value data 350 has a positive value, step 540 follows. When it has a negative value, step 550 follows. For instance, in the case of the normal developing type and the Nth interruption occurrence of the interruption signal 322, the value of the synthetic fine adjustment value data 350 is set to "−2" and the processing routine advances to step 550. In another example, in the case of the normal developing type and the (M+1)th interruption occurrence of the interruption signal 322, the value of the synthetic fine adjustment value data 350 is set to "+3" and step 540 follows.

In step 540, the reduction pixel signal 405 is selected as the final pixel signal 302 by the selection signal 431 in the case of the normal developing type, while the enlargement pixel signal 407 is selected as the final pixel signal 302 by the selection signal 431 in the case of the inversional developing type. That is, an image is thickened. Further, the absolute value of the synthetic fine adjustment value data 350 is output as the delay time indication signal 430 and the interrupting processes are finished. For example, in the case of the normal developing type and the (M+1)th interruption occurrence of the interruption signal 322, the reduction pixel signal 405 is selected as the final pixel signal 302 and the absolute value "3" of the synthetic fine adjustment value data 350 is output as the delay time indication signal 430.

In step 550, the enlargement pixel signal 407 is selected as the final pixel signal 302 by the selection signal 431 in the case of the normal developing type, while the reduction pixel signal 405 is selected as the final pixel signal 302 by the selection signal 431 in the case of the inversional developing type. That is, an image is faded. Further, the absolute value of the synthetic fine adjustment value data 350 is output as the delay time indication signal 430 and the interrupting processes are finished. For instance, in the case of the normal developing type and the Nth interruption occurrence of the interruption signal 322, the enlargement pixel signal 407 is selected as the final pixel signal 302 and the absolute value "2" of the synthetic fine adjustment value data 350 is output as the delay time indication signal 430.

According to the embodiment, there is an advantage such that a thickness or thinness of an image which is actually needed by the operator can be reproduced in the image at a high fidelity.

Further, according to the embodiment, even for a fluctuation of the developing level, an always constant thickness or thinness of an image can be reproduced and a stable image quality can be obtained.

Further, according to the embodiment, an image can be easily emphasized and a construction on the side of the pixel information generating section can be simplified.

I claim:

1. A scanning type image recording apparatus in which an electrostatic latent image is formed onto a recording medium by clock signal generating means for generating a clock signal, pixel signal generating means for generating a time sequential pixel signal synchronously with the clock signal, modulating means for modulating a light beam in accordance with the time sequential pixel signal; scanning means for deflecting the light beam and scanning the recording medium, and start point detecting means which is provided over a scanning line of the light beam deflected by said scanning means and feeds back scan start timing information to said clock signal generating means and said pixel signal generating means and, said electrostatic latent image is developed by developing means, said scanning type image recording apparatus further comprising:
   input means for indicating a fine adjustment value of a pulse width of said time sequential pixel signal;
   scanning position control means for discriminating that the scanning line of the optical beam does not exist on the recording medium on the basis of the scan start timing information from said start point detecting means; and
   pulse width fine adjusting means for setting a pulse width fine adjustment value in accordance with an indication of said input means during the discrimination of said scanning position control means and for outputting a final pixel signal which is obtained by finely adjusting the time sequential pixel signal to said modulating means.

2. An apparatus according to claim 1 wherein said scanning position control means further has means for discriminating a period of time when it is unnecessary to develop said time sequential pixel signal.

3. A scanning type image recording apparatus in which an electrostatic latent image is formed onto a recording medium by clock signal generating means for generating a clock signal, pixel signal generating means for generating a time sequential pixel signal synchronously with said clock signal, latching means for latching the time sequential pixel signal transmitted through a signal transmission path by said clock signal transmitted via the same signal transmission path as said signal transmission path and for outputting a shaped pixel signal, modulating means for modulating a light beam in accordance with said shaped pixel signal, scanning means for deflecting the light beam and for scanning the recording medium, and start point detecting means which is provided on a scanning line of the light beam deflected by said scanning means and feeds back scan start timing information to said clock signal generating means and said pixel signal generating means and, further, said electrostatic latent image is developed by developing means, said scanning type image recording apparatus comprising:
   input means for indicating a fine adjustment of the pulse width of said shaped pixel signal;
   scanning position control means for discriminating that the scanning line of the light beam does not exist on the recording medium on the basis of the scan start timing information from said start point detecting means; and
   pulse width fine adjusting means for setting a pulse width fine adjustment value in accordance with an indication of said input means during the discrimination of said scanning position control means and for outputting a final pixel signal which is obtained by finely adjusting said shaped pixel signal to said modulating means.

4. An apparatus according to claim 3 wherein said scanning position control means further has means for discriminating a period of time when it is unnecessary to develop said time sequential pixel signal.

5. A scanning type image recording apparatus comprising:
   pixel signal input means for inputting a pixel signal to be recorded from an external pixel signal generating means;
   modulating means for modulating a light beam in accordance with said pixel signal;
   scanning means for deflecting said modulated light beam, for scanning and exposing a recording medium, and for forming an electrostatic latent image onto said recording medium; and
   developing means for developing said electrostatic latent image formed on the recording medium,
   wherein said image recording apparatus further comprises
   user input means which is provided on an operation panel and indicates a picture quality fine adjustment value of a recording image based on said pixel signal, and
   pulse width fine adjusting means for setting a pulse width fine adjustment value in accordance with an indication from said user input means and for giving a final pixel signal which is obtained by finely adjusting the pulse width of the pixel signal in accordance with said set picture quality fine adjustment value to said modulating means.

6. An apparatus according to claim 5, wherein said recording apparatus further includes start point detecting means which is provided over a scanning line of the light beam deflected by said scanning means and transmits scan start timing information to said pixel signal generating means and scanning position control means for discriminating that the deflecting scanning position of the light beam does not exist in a recording area on the recording medium on the basis of the scan start timing information from the start point detecting means,
   and wherein said pulse width fine adjusting means sets the pulse width fine adjustment value in accordance with an indication from said user input means for a period of time when the deflecting scanning position does not exist in the recording area on the recording medium and, thereafter, gives to said modulating means a final pixel signal which is obtained by finely adjusting the pulse width of the pixel signal in accordance with said set fine adjustment value for a period of time when the deflecting scanning position exists in the recording area on the recording medium.

7. A scanning type image recording apparatus comprising:
   clock signal generating means for generating a clock signal;
   pixel signal generating means for generating a time sequential pixel signal synchronously with said clock signal;
   modulating means for modulating a light beam in accordance with the time sequential pixel signal;
   scanning means for deflecting said modulated light beam, for scanning and exposing a recording medium, and for forming an electrostatic latent image onto the recording medium;
   start point detecting means which is provided over a scanning line of the light beam deflected by said scanning means and feeds back scan start timing information to said clock signal generating means and said pixel signal generating means; and
   developing means for developing the electrostatic latent image formed on the recording medium,
   wherein said image recording apparatus comprises,
   user input means which is provided on an operation panel and indicates a fine adjustment value of a pulse width of the time sequential pixel signal,
   scanning position control means for discriminating that the deflecting scanning position of the light beam does not exist in a recording area on the recording medium on the basis of the scan start timing information from said start point detecting means, and
   pulse width fine adjusting means for setting a pulse width fine adjustment value in accordance with an indication from said user input means for a period of time when the deflecting scanning position does not exist in the recording area on the recording medium and, thereafter, for giving to said modulating means a final pixel signal which is obtained by finely adjusting the pulse width of the time sequential pixel signal in accordance with said set fine adjustment value for a period of time when the deflecting scanning position exists in the recording area on the recording medium.

8. A scanning type image recording apparatus comprising:
   Pixel signal input means for time sequentially inputting a pixel signal from pixel signal generating means synchronously with a clock signal;
   modulating means for modulating a light beam in accordance with said time sequential pixel signal;
   scanning means for deflecting said modulated light beam, for scanning and exposing a recording medium, and for forming an electrostatic latent image onto the recording medium;
   start point detecting means which is provided over a scanning line extension of the light beam deflected by said scanning means and detects the passage of the light beam and feeds back scan start timing information to said pixel signal generating means; and
   developing means for developing the electrostatic latent image formed on the recording medium by said scanning and exposure,
   wherein said modulating means comprises
   input means which is provided on an operation panel of said image recording apparatus and indicates a fine adjustment value of a pulse width of the time sequential pixel signal,
   scanning position control means for discriminating that the scanning position of the light beam does not exist in a recording area on the recording medium on the basis of the scan start timing information from said start point detecting means, and
   pulse width fine adjusting means for setting a pulse width fine adjustment value in accordance with an indication from said input means for a period of time when the light beam does not scan the recording area on the recording medium and, thereafter, for finely adjusting the pulse width of the time sequential pixel signal which is input during the scanning of the recording area on the recording medium in accordance with said fine adjustment value and for outputting a final pixel signal to modulate the light beam.

9. A scanning type image recording apparatus comprising:
   pixel signal input means for time sequentially inputting a pixel signal from pixel signal generating means synchronously with a clock signal;

modulating means for modulating a light beam in accordance with said time sequential pixel signal;

scanning means for deflecting said modulated light beam, for scanning and exposing the recording medium, and for forming an electrostatic latent image onto said recording medium;

start point detecting means which is provided over a scanning line extension of the light beam deflected by said scanning means and detects the passage of the light beam and feeds back scan start timing information to said pixel signal generating means; and developing means for developing the electrostatic latent image formed on the recording medium by said scanning and exposure, wherein said modulating means comprises user input means which is provided on an operation panel of said image recording apparatus and indicates a fine adjustment value of a pulse width of said time sequential pixel signal, self fine adjustment request means for generating a self fine adjustment value corresponding to a developing level by said developing means, and pulse width fine adjusting means for setting a pulse width fine adjustment value in accordance with inputs from said user input means and said self fine adjustment request means for a period of time when the light beam does not scan a recording area on the recording medium and, thereafter, for finely adjusting the pulse width of the time sequential pixel signal which is input during the scanning of the recording area on the recording medium in accordance with the fine adjustment value and for outputting a final pixel signal to modulate the light beam.

10. A scanning type image recording apparatus comprising:

external signal input means for inputting a time sequential pixel signal and an emphasis request signal from pixel signal generating means synchronously with a clock signal;

modulating means for modulating a light beam in accordance with said time sequential pixel signal;

scanning means for deflecting said modulated light beam, for scanning and exposing the recording medium, and for forming an electrostatic latent image onto the recording medium;

start point detecting means which is provided over a scanning line extension of the light beam deflected by said scanning means and detects the passage of the light beam and feeds back scan start timing information to said pixel signal generating means; and developing means for developing the electrostatic latent image formed on the recording medium by said scanning and exposure, wherein said modulating means comprises user input means which is provided on an operation panel of said image recording apparatus and indicates a fine adjustment value of the pulse width of said time sequential pixel signal, self fine adjustment request means for generating a self fine adjustment value corresponding to a developing level by said developing means, and pulse width fine adjusting means for setting a pulse width fine adjustment value for a period of time when the light beam does not scan a recording area on the recording medium in accordance with the emphasis request signal which is input from said pixel signal generating means and the inputs from said user input means and said self fine adjustment request means and, thereafter, for finely adjusting the pulse width of the time sequential pixel signal which is input during the scanning of the recording area on the recording medium in accordance with said fine adjustment value and for outputting a final pixel signal to modulate the light beam.

11. An image recording system comprising:

pixel information generating means having clock signal generating means for generating a clock signal and pixel signal generating means for generating a time sequential pixel signal synchronously with said clock signal, and scanning type image recording means which is connected to said pixel information generating apparatus through a transmission path and comprises: latching means for latching the time sequential pixel signal transmitted through said signal transmission path by said clock signal transmitted through said transmission path and for outputting a shaped pixel signal; modulating means for modulating a light beam in accordance with said shaped pixel signal; scanning means for deflecting said modulated light beam, for scanning and exposing a recording medium, and for forming an electrostatic latent image onto the recording medium; start point detecting means which is provided over a scanning line extension of the light beam deflected by said scanning means and detects the passage of the light beam and feeds back scan start timing information to the pixel signal generating means; and developing means for developing the electrostatic latent image formed on the recording medium by said scanning and exposure, wherein said modulating means comprises input means which is provided on an operation panel of said image recording apparatus and indicates a fine adjustment value of a pulse width of said shaped pixel signal, scanning position control means for discriminating that the scanning position of the light beam does not exist in a recording area on the recording medium on the basis of the scan start timing information from said start point detecting means, and pulse width fine adjusting means for setting a pulse width fine adjustment value in accordance with an indication from said input means for a period of time when the light beam does not scan a recording area on the recording medium and, thereafter, for finely adjusting the pulse width of said shaped pixel signal which is input during the scanning of the recording area on the recording medium in accordance with said fine adjustment value and for outputting a final pixel signal to modulate the light beam.

12. An image recording system comprising:

pixel information generating means having clock signal generating means for generating a clock signal and pixel signal generating means for generating an emphasis request signal and a time sequential pixel signal synchronized with said clock signal, and scanning type image recording means which is connected to said pixel information generating means through a transmission path and comprises: latching means for latching said time sequential pixel signal transmitted through said signal transmission path by said clock signal transmitted through said transmission path and for outputting a shaped pixel signal; modulating means for modulating a light beam in accordance with said shaped pixel signal; scanning means for deflecting said modulated light beam, for scanning and exposing a recording medium, and for forming an electrostatic latent image onto the recording medium; start point detecting means which is provided over a scanning line extension of the light beam deflected by said scanning means and detects the passage of the light beam and feeds back scan start timing information to the pixel signal generating means; and developing means for developing the electrostatic latent image formed on the recording medium by said scanning and exposure, wherein said modulating means comprises user input means which is provided on an operation panel of said image recording apparatus and indicates a fine adjustment value of a pulse width of said shaped pixel signal, and pulse width fine adjusting means for setting a pulse width fine adjustment value for a period of time when the light beam does not scan a recording area on the recording medium in accordance with the emphasis request signal which is input from said pixel signal generating means and the input from said user input means and, thereafter, for finely adjusting the pulse width of the shaped pixel signal which is input during the scanning of the recording area on the recording medium in accordance with said fine adjustment value and for outputting a final pixel signal to modulate the light beam.

13. An image recording system comprising:

pixel information generating means having clock signal generating means for generating a clock signal and pixel signal generating means for generating an emphasis request signal and a time sequential pixel signal synchronized with said clock signal, and scanning type image recording means which is connected to said pixel information generating means through a transmission path and comprises: latching means for latching said time sequential pixel signal transmitted through said signal transmission path by said clock signal transmitted through said transmission path and for outputting a shaped pixel signal; modulating means for modulating a light beam in accordance with said shaped pixel signal; scanning means for deflecting said modulated light beam, for scanning and exposing a recording medium, and for forming an electrostatic latent image onto the recording medium; start point detecting means which is provided on a scanning line extension of the light beam deflected by said scanning means and detects the passage of the light beam and feeds back scan start timing information to said pixel signal generating means; and developing means for developing the electrostatic latent image formed on the recording medium by said scanning and exposure, wherein said modulating means comprises user input means which is provided on an operation panel of said image recording apparatus and indicates a fine adjustment value of a pulse width of said shaped pixel signal, self fine adjustment request means for generating a self fine adjustment value corresponding to a developing level by said developing means, and pulse width fine adjusting means for setting a pulse width fine adjustment value for a period of time when said light beam does not scan a recording area on the recording medium in accordance with the emphasis request signal which is input from said pixel signal generating means and the input from said user input means and said self fine adjustment request means and, thereafter, for finely adjusting the pulse width of the shaped pixel signal which is input during the scanning of the recording area on the recording medium in accordance with said fine adjustment value and for outputting a final pixel signal to modulate the light beam.

* * * * *